(Model.) 3 Sheets—Sheet 1.
S. CULVER.
APPARATUS FOR DRYING FRUIT.
No. 265,394. Patented Oct. 3, 1882.
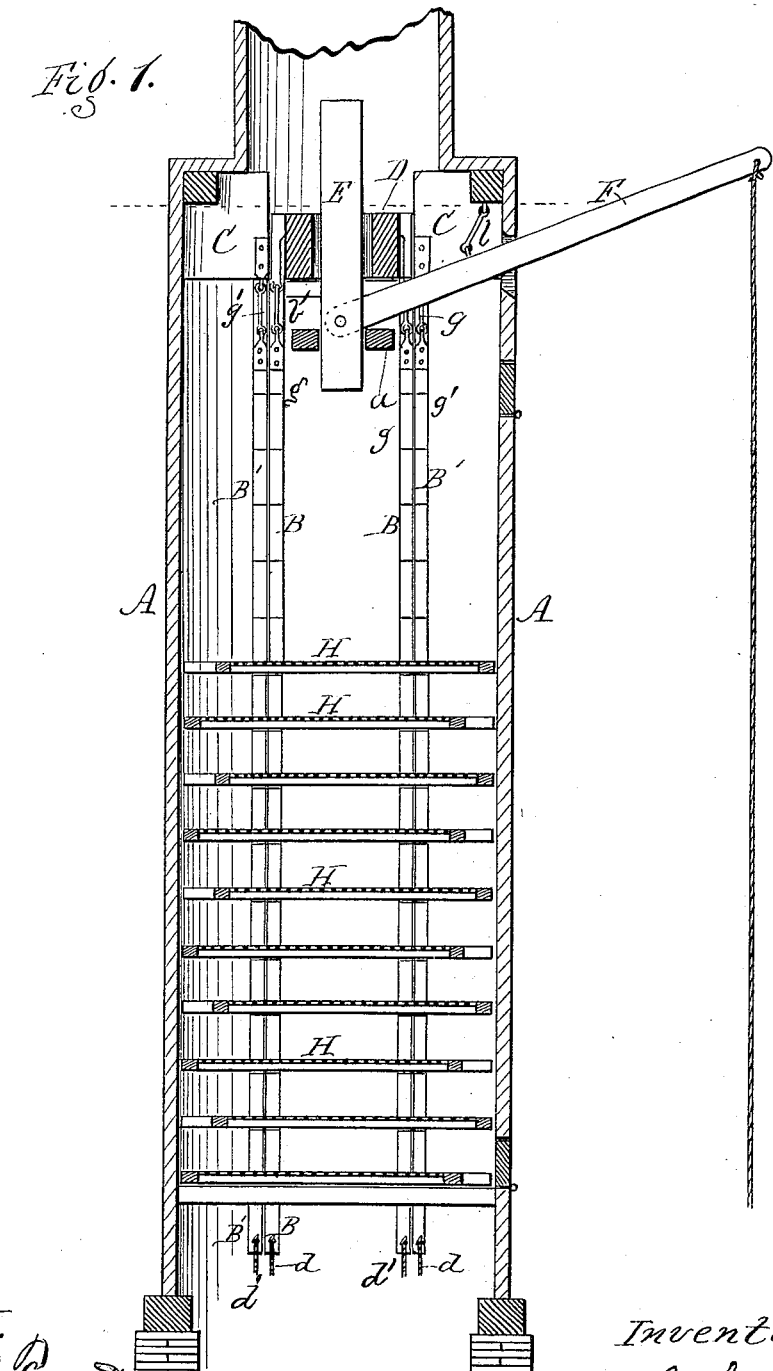

(Model.) 3 Sheets—Sheet 2.
S. CULVER.
APPARATUS FOR DRYING FRUIT.
No. 265,394. Patented Oct. 3, 1882.
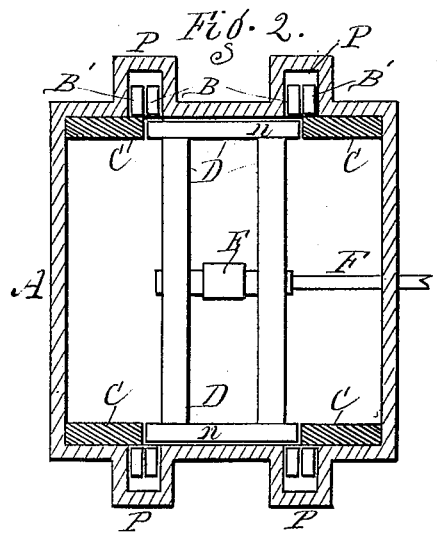
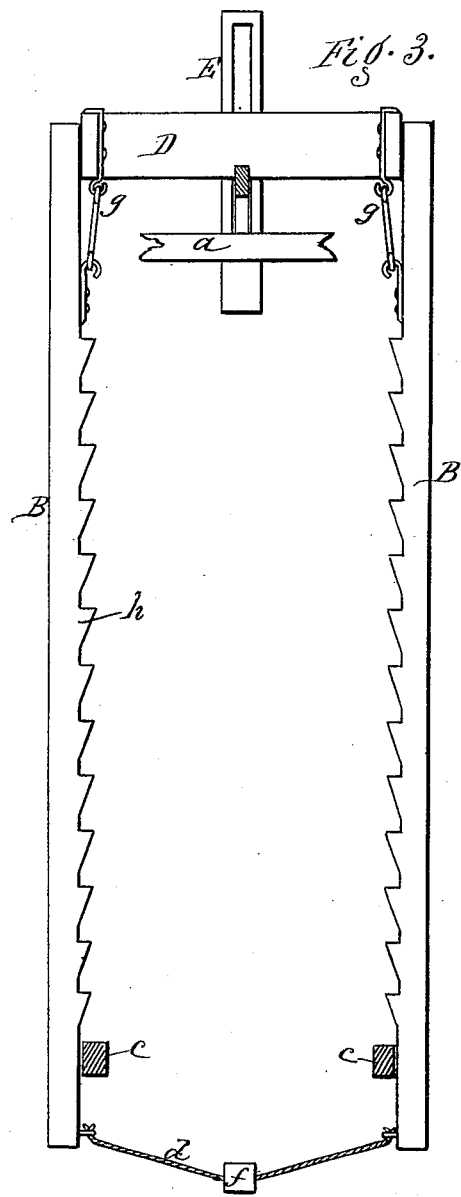
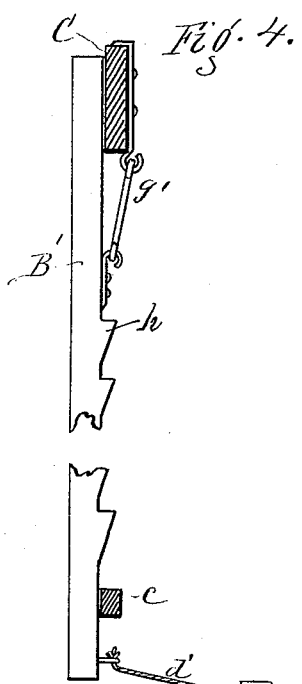
Attest.
Joel Geo. Prescott
H. P. VanDuzen
Inventor:
Stephen Culver

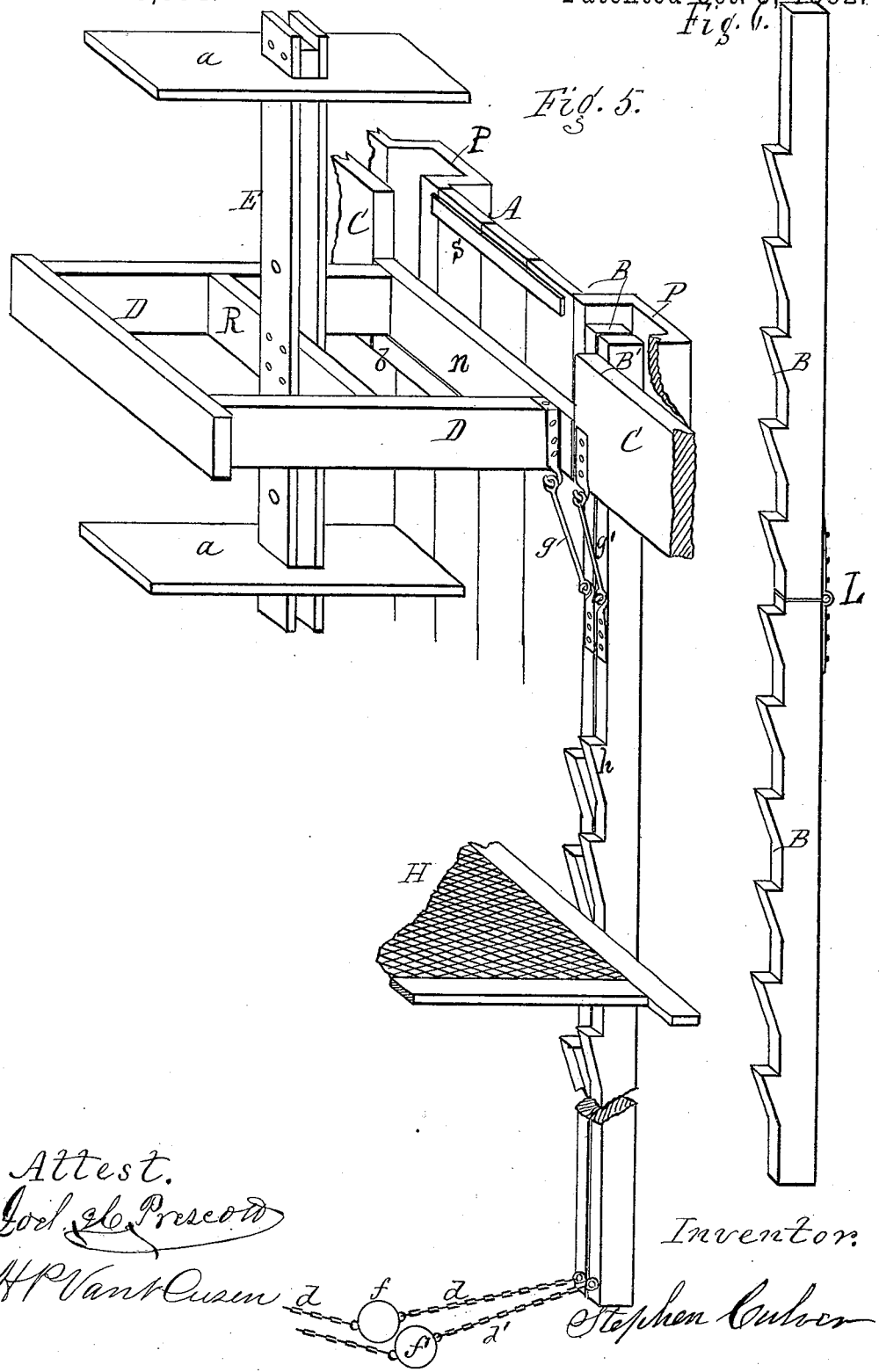

UNITED STATES PATENT OFFICE.

STEPHEN CULVER, OF NEWARK, NEW YORK, ASSIGNOR OF ONE-HALF TO HARLAN P. VAN DUSEN, OF SAME PLACE; (HARLAN P. VAN DUSEN, ADMINISTRATOR OF SAID STEPHEN CULVER, DECEASED.)

APPARATUS FOR DRYING FRUIT.

SPECIFICATION forming part of Letters Patent No. 265,394, dated October 3, 1882.

Application filed September 20, 1880. (Model.)

*To all whom it may concern:*

Be it known that I, STEPHEN CULVER, of the village of Newark, in the county of Wayne and State of New York, have invented a new and useful Improvement in Apparatus for Drying Fruit and Vegetables, which improvement is fully set forth in the following specification and accompanying drawings, in which—

Figure 1 is a vertical section, showing the apparatus divided centrally from front to rear. Fig. 2 is a horizontal transverse section, showing the relation to each other of the several principal parts. Fig. 3 is a vertical section, showing the lifting or elevating bars, the frame or thread to which they are suspended, and the mode of suspension. Fig. 4 is a vertical section, showing the supporting-bars, the block to which they are suspended, and the manner of suspension. Fig. 5 is a perspective view of a part of the apparatus, showing upper portion of the shaft in which the racks move and two of the slots in which the bars operate, one of the blocks to which the supporting-bars are suspended, the frame to which the lifting-bars are suspended, a set of bars and the links by which they are suspended, and a section of a rack or tray in place on the brackets. Fig. 6 is a perspective view of a bar made in sections.

The object of my invention is to furnish a device by which to raise with facility from the bottom to the top of a shaft of a fruit-drying apparatus the racks or trays on which the fruit is spread for drying, and also a device by which the racks are kept in place in the shaft when projected beyond each other front and rear alternately, for the purpose of causing a zigzag or reverted current of air between them.

In the drawings, A, Figs. 1, 2, and 5, are sides of a vertical shaft of any convenient height, from fifteen to thirty feet, and of any extent of cross-section, from three to six feet. On each side of the shaft, right and left, and from a fourth to a third of the distance across from front to rear, are two slots or recesses, P, Figs. 2 and 5, extending outwardly from the interior surface of the side of the shaft within which the supporting-bars B' and lifting-bars B, Figs. 2 and 5, are suspended. The width of the slots, which is governed by the thickness of the bars, is such as to permit the same to move freely side by side within them. The depth is equal to the extent of the cross-section of the bars and the brackets combined, measured at the top of the bracket, with an excess sufficient to prevent contact at the rear of the bars when the brackets are moved back flush with the surface of the inner side of the shaft. Suspended within each of the slots are two bars, B' B, Figs. 2 and 5, one for supporting and the other for lifting the racks on which the fruit is spread. Their length is the same as that of the slots, or thereabout, and they may be made of wood or iron, and, if of wood, may be from one and one-fourth to one and three-eighths inch thick and from three to four inches wide. To these bars stationary brackets $n$, Figs. 2 and 5, on which the racks rest, are affixed by screws or bolts. They may be of wood or iron, from three and one-half to five inches long, according to the distance apart, and at the upper or supporting end should project from one inch to an inch and a fourth from the face of the bar, and, if of wood, are better if sawed in such a way that the face corresponds in direction with the grain or fiber. Either the inner or outer bars may be made the supporting ones, and conversely the lifting ones, though it is more convenient to make the outer ones, or those farthest from the middle of the shaft, supporting-bars. Instead of being put into slots in pairs, they may be put into slots separately.

When the bars are long they sometimes tend to spring in their middle or central portion out of line and away from the racks. To obviate such tendency and to keep them more perfectly against the racks, they are made in two sections by being divided at or near the middle and united by a hinge or its equivalent on the rear edge, as shown at L, Fig. 6, and being suspended by attachment at the front edge at the top and hinged on the rear edge near the middle, they incline to bend or bow inwardly toward the racks, and should there be a departure outwardly from a straight line a piece of paper or pasteboard laid in the joint near the front edge brings them into line, or, if desired, causes them to bow inwardly toward the racks. C, Figs. 1, 2, 4, and 5, is a block fixed to the inner side of the shaft, as shown, from which the supporting-bars B', Figs. 1, 2, 4, and 5, are suspended. It is from two to three inches thick and of any convenient width, and overlaps the slot half-way across, where it meets the lifting-frame D, as shown in Figs. 2 and 5. The height of the block should be at least equal to twice the depth of the lifting-frame, that it may form a way or guide for the same, as shown in Figs. 2 and 5. By the use of a longer or a shorter supporting-bar the block or its equivalent may be placed either above or below the lifting-frame, and a cleat or piece of different form may be fixed to sides of the shaft as a substitute for the block.

D, Figs. 1, 2, 3, and 5, is a frame or head to which the lifting-bars are suspended, as shown in Figs. 1, 3, and 5, and by which they are simultaneously raised and dropped. It is made of pieces from one and one-fourth to one and one-half inch thick and from six to nine inches wide. Its length is equal to the extent of the shaft from right to left, less sufficient to admit of its moving up and down freely. The end pieces, $n$, Figs. 2 and 5, reach from one block (to which the supporting-bars are suspended) to the other on the same side of the shaft, with sufficient room between to permit the frame to move freely alongside the blocks, which serve as a way or guide for it. Beneath the frame at the ends are strips or cleats $b$, Figs. 1 and 5, affixed to the side of the shaft on which the frame rests, their upper edges being in line with the lower ends of the blocks to which the supporting-bars are suspended, unless for the purpose of better adjusting the relation of the brackets to each other on different bars it becomes convenient to place them a little above or below such line. Above the frame, on the same sides of the shaft, are other cleats, S, Fig. 5, which limit the movement of the frame upwardly, and are at such height above the lower cleats as to permit the frame and lifting-bars attached to be raised sufficiently to move the racks from one set of brackets on the supporting-bars up to another.

Midway longitudinally of the frame is a cross-piece or girder, R, Fig. 5, to which, in the middle of it on each side, vertical pieces E, Figs. 1, 3, and 5, are rigidly fixed, which constitute a guide-bar for the purpose of securing a movement of the frame parallel vertically with the sides of the shaft. These pieces reach downwardly below the frame or upwardly above it, or both, and pass through an aperture in a piece, $a$, lying horizontally and at such distance from the ends of the bar that it will not be withdrawn from the aperture in its upward or downward movement, as shown, Figs. 1, 3, and 5. A parallel movement of the frame may be secured by devices different from that described.

To and between the pieces composing the guide-bar a lever, F, Figs. 1 and 2, is pivoted, by which to raise the frame and the lifting-bars suspended to it. The link $l$, Fig. 1, serves as a fulcrum for the lever and allows it to conform to the movement of the lifting-frame. The lever may be pivoted either below or above the frame.

The supporting-bars B', Figs. 1, 4, and 5, are suspended to the block C by links $g'$, Figs. 1, 4, and 5, and the lifting-bars B, Figs. 1, 3, and 5, to the frame D, Figs. 1, 3, and 5, by the links $g$, Figs. 1 and 5, which are from ten to twelve inches in length, and are adjusted in an oblique or angular position, as shown in Figs. 3, 4, and 5, their upper ends being placed forward of the front edge of the bars, to which they are attached at their lower ends, from two to three inches, by means of which the bars at their upper end are held by their own weight closely to the block and to the frame, and in their upper portion to the racks also, and at the same time by such angular adjustment the bars are permitted to recede from the racks by an oblique movement sufficiently to permit the racks in the operation of being elevated to pass and be passed by the brackets.

$c$, Figs. 3 and 4, is a cleat to prevent the bars from swinging or being drawn from the slot, and to serve as a slide for the racks when being put into the shaft.

$f f'$, Figs. 3, 4, and 5, are weights hung upon chains or wires $d d'$, attached to the lower ends of opposite corresponding bars, for holding them against the cleat $c$, Figs. 3, 4, and 5, and so keep the inner edge of the bars flush with the surface of the inner sides of the shaft and up against the racks. From three to three and one-half pounds to a weight are usually sufficient. Springs or other equivalent may be used instead of weights.

H, Figs. 1 and 5, is a rack or tray on which the fruit is spread to be dried. Its dimensions may be equal to those of a transverse section of the shaft less sufficient to admit of its being easily introduced and removed; or, as is better, they may be made from two to three inches less in depth, and thus not fill the shaft from front to rear by such number of inches, so that by placing them alternately against the front and rear sides of the shaft, as shown in Fig. 1, a reverted or zigzag passage under and over the racks is formed from the bottom to the top of the shaft, by which the vapor from the fruit is more speedily removed from the shaft and the process of drying is facilitated. To keep the racks in such case in position and prevent their being jostled out of place, the two side pieces of the rack, which rest upon the brackets, are elongated or projected beyond the frame of the rack, as shown in Fig. 5, sufficiently to make their length equal to the distance across the shaft from front to rear less sufficient to admit of the racks moving freely in the shaft. The racks, being charged with fruit, are put into the shaft at the bottom and are removed at or near the top.

From the foregoing it will be seen that when not undergoing the operation of being raised the racks rest upon the brackets of the supporting-bars, as shown in Fig. 5, and that the brackets of the lifting-bars, as shown in Fig. 5, are freely beneath them; that in the operation of being elevated the racks in their ascent impinge against the brackets on the supporting-bars and cause both brackets and bar to recede sufficiently to permit the racks to pass the brackets; that, on the other hand, the brackets on the lifting-bars in their descent impinge upon the racks, and both brackets and bar are caused to recede sufficiently to permit the brackets to pass the racks; also, that on the lever being depressed the brackets of the lifting-bars engage and lift the racks against the next and succeeding brackets on the supporting-bars and cause them to rise slightly upwardly, and at the same time to recede outwardly sufficiently to permit the racks to pass them, when, by the force of gravity, the bars drop back and the brackets on them enter beneath the racks thus raised, and upon the lifting-bars being permitted to descend these brackets receive and again support the racks; that in the descent of the lifting-bars the brackets upon them, by impingement against the racks, cause the bars to recede sufficiently to permit the brackets to pass and enter beneath them, in which position they are ready to be raised again to lift the racks to the next succeeding brackets upon the supporting-bars, and that by repetition of the operation described the racks are raised from the bottom to the top of the shaft.

Having thus described my invention, what I claim as new, and desire to secure by Letters Patent, is—

1. The lifting-frame, in combination with the bars B B, suspended therefrom, and operating substantially as described.

2. The guiding-blocks C, from which the supporting-bars B' B' are suspended, in combination with the lifting-frame and its bars, arranged and operating substantially as described.

3. The supporting and the lifting bars suspended respectively from the blocks and from the lifting-frame, substantially as described, whereby they are adapted to alternately recede to permit the upward movement of the trays and the downward movement of the lifting-bars past said trays, substantially as set forth.

4. The drier-shaft provided with the grooved or recessed side walls, in combination with the supporting and lifting bars suspended and adapted to alternately recede within said grooves or recesses, substantially as described.

5. The links $g'$ $g$, suspending respectively the supporting and the lifting bars, having the angular arrangement described, whereby the upper portions of the bars are held up to and caused to engage with the trays, substantially as and for the purpose set forth.

6. The combination, with the lower ends of the suspended supporting and lifting bars, of weights or equivalent means for holding said ends up to and causing them to engage with the trays, substantially as described.

7. The supporting and lifting bars made in sections, connected by hinges or their equivalents, substantially as described.

STEPHEN CULVER.

Witnesses:
JOEL H. PRESCOTT,
H. P. VAN DUSEN.